United States Patent
Yun

[19]

[11] Patent Number: 5,873,048
[45] Date of Patent: Feb. 16, 1999

[54] LOCATOR AND METHOD FOR A WIRELESS COMMUNICATION SYSTEM

[75] Inventor: Paul Munsang Yun, Lambertville, N.J.

[73] Assignee: Lucent Technologies Inc., Murray Hill, N.J.

[21] Appl. No.: 508,574

[22] Filed: Jul. 27, 1995

[51] Int. Cl.$^6$ .................................................. H04B 7/02
[52] U.S. Cl. ..................... 455/562; 455/277.1; 342/359; 342/372
[58] Field of Search ................................. 455/33.1, 33.3, 455/53.1, 54.1, 56.1, 62, 63, 67.1, 272, 275, 276.1, 277.1, 278.1, 324, 422, 423, 436, 440, 441, 456, 457, 507, 517, 524, 561, 562; 342/359, 372; 379/59; 375/322, 326, 329, 334; 324/760.11, 76.19

[56] References Cited

U.S. PATENT DOCUMENTS

| | | | |
|---|---|---|---|
| 5,087,917 | 2/1992 | Fujisaka | 342/372 |
| 5,200,755 | 4/1993 | Matsuda | 342/372 |
| 5,214,390 | 5/1993 | Montreuil | 375/329 |
| 5,303,240 | 4/1994 | Borras et al. | 455/277.1 |
| 5,425,057 | 6/1995 | Paff | 375/326 |
| 5,446,370 | 8/1995 | Voight | 455/33.1 |
| 5,557,285 | 9/1996 | Bender et al. | 342/359 |
| 5,596,329 | 1/1997 | Searle et al. | 342/372 |

*Primary Examiner*—Thanh Cong Le

[57] ABSTRACT

A passive locator and method for a wireless communication system. The locator (56) at base station (12) determines the position and trajectory of wireless terminal (22). The passive locator (56) adjusts azimuthal and elevational angles of a directional antenna (58) until a relative maximum power is detected in the signal transmitted from the wireless terminal (22). A processing circuit (60) determines the trajectory of the wireless terminal (22) by generating and analyzing data that represents the Doppler effect on the signal from the wireless terminal (22).

28 Claims, 9 Drawing Sheets

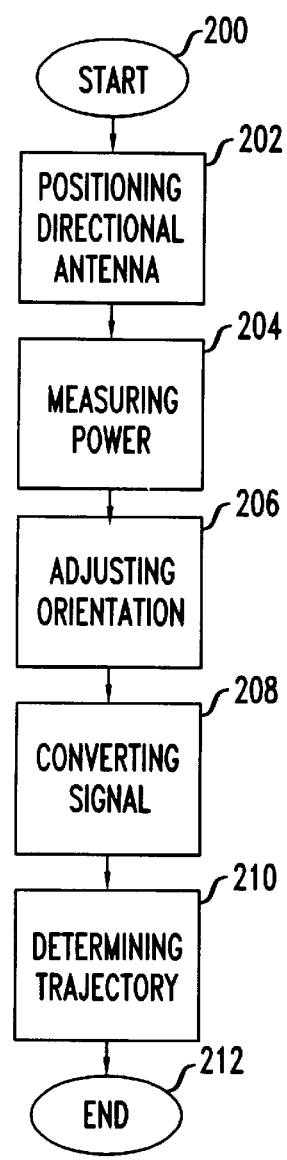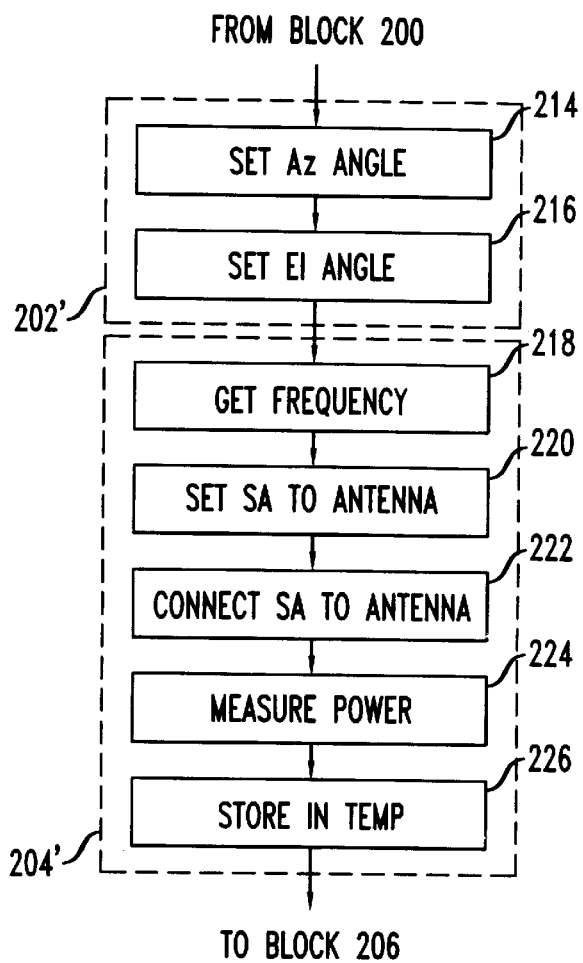

LOCATOR AND METHOD FOR A WIRELESS COMMUNICATION SYSTEM

FIELD OF THE INVENTION

This invention relates in general to the field of electronic circuits. More particularly, this invention relates to a passive locator and method for a wireless communication system.

BACKGROUND OF THE INVENTION

In a wireless communication system, wireless terminals communicate with a Public Switched Telephone Network (PSTN) through distributed base stations. Each base station covers a selected geographic region commonly referred to as a "cell". At the boundaries, cells often overlap such that multiple base stations cover some common geographic area. While in a common area, a wireless terminal may be serviced by any of the associated base stations. Thus, when a call is initiated in a common area, a Mobile Switching Center (MSC) connects the call to the base station that receives the strongest signal from the wireless terminal. In current systems, the MSC connects the call to this base station even if the wireless terminal is traveling away from the base station. This can lead to unwanted service interruptions.

As a wireless terminal moves between cells during a single call, the wireless system disconnects the call from a first base station and connects the call through a second base station. This is commonly referred to as a "hand-off". Current wireless systems monitor the power of a signal received from a wireless terminal to determine when to hand-off a call to a different base station. When the signal power falls below a selected level, the wireless system polls the neighboring base stations to measure the power of the signal from the wireless terminal. The wireless system connects the call to the base station that recorded the strongest signal from the wireless terminal. By basing the hand-off decision on signal power, current wireless systems often hand-off a call to a base station even if the wireless terminal is currently moving away from the base station. Ultimately, such an improper hand-off can also lead to service interruption and subscriber dissatisfaction.

The demand for wireless telephone service is increasing at a rapid rate. To increase the capacity of existing wireless systems, wireless service providers split cells to increase the effective frequency reuse in a given area. By thus splitting the existing cells, a wireless service provider increases the number of potential hand-offs required during a single call and also increases the number of overlapping areas covered by multiple base stations. Thus, the frequency of improper hand-offs and subscriber dissatisfaction are likely to also increase.

SUMMARY OF THE INVENTION

In accordance with the teachings of the present invention, a passive locator and method for a wireless communication system is shown and described which reduces disadvantages and problems associated with prior wireless systems. More particularly, in one embodiment the present invention provides a base station incorporating a passive locator. The passive locator includes a directional antenna, a processing circuit and an antenna controller. The passive locator determines the position of the wireless terminal by adjusting the orientation of the directional antenna until it measures a peak power from the signal from the wireless terminal. The passive locator also analyzes the signal from the wireless terminal to determine the trajectory of the wireless terminal. Thus, a passive locator constructed according to the teachings of the present invention provides position and trajectory information to the wireless system to increase the likelihood of proper hand-offs.

BRIEF DESCRIPTION OF THE DRAWING

For a more complete understanding of the present invention and the advantages thereof, reference is now made to the following description taken in conjunction with the accompanying drawings in which like reference numbers indicate like features and wherein:

FIG. 9 is a flow chart of a method for determining the position and trajectory of a wireless terminal in a wireless telephony system according to the teachings of the present invention; and FIGS. 10 through 16 are flow charts of embodiments of the steps of the method of FIG. 5 according to the teachings of the present invention.

DETAILED DESCRIPTION

Figure 1:
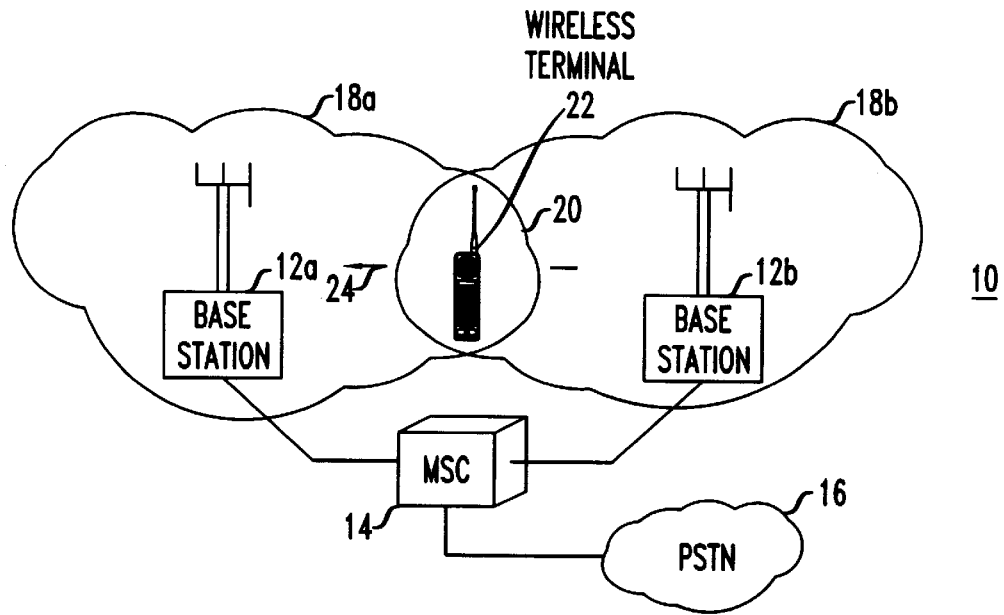
FIG. 1 is a block diagram of a wireless telephony system incorporating a passive locator constructed according to the teachings of the present invention.

FIG. 1 is a block diagram of a wireless communications system indicated generally at 10 constructed according to the teachings of the present invention. Wireless system 10 includes base stations 12a and 12b that can independently determine the position and trajectory of wireless terminals 22. Base stations 12a and 12b are coupled to and in communication with a mobile switching center (MSC) 14. It is noted that base stations 12a and 12b are shown in FIG. 1 by way of example and not by way of limitation. It is understood by those of ordinary skill in the art that wireless system 10 may include any approximate number of base stations. MSC 14 is coupled to and in communication with a Public Switched Telephone Network (PSTN) 16. Base stations 12a and 12b cover geographical areas 18a and 18b referred to as "cells". As shown in FIG. 1, cell 18a overlaps with cell 18b in a region 20. Wireless system 10 further includes one or more wireless terminals 22 that are operable to travel among the various cells 18 of wireless system 10.

In region 20, either base station 12a or base station 12b may service wireless terminal 22.

In operation, wireless system 10 measures the position and trajectory of wireless terminal 22 for use in call processing. This feature according to the teachings of the present invention provides several technical advantages. First, base stations 12a and 12b reduce the risk that MSC 14 will hand-off a call to a base station which is located opposite the direction of travel for wireless terminal 22. Furthermore, base stations 12a and 12b assist MSC 14 in selecting the most appropriate base station when wireless terminal 22 either initiates a call in region 20 or enters region 20 during a call.

For example, wireless terminal 22 may initiate a call in region 20. Base stations 12a and 12b independently determine the location and trajectory of wireless terminal 22. As shown, wireless terminal 22 is traveling in the direction indicated by arrow 24 toward base station 12a. Thus, MSC 14 selects base station 12a for the call from wireless terminal 22 even if the signal from wireless terminal 22 is stronger at base station 12b than at base station 12a. This may avoid a hand-off as wireless terminal 22 exits region 20 toward base station 12a.

Alternatively, wireless terminal 22 may initiate a call in cell 18b while outside of region 20. In this case, MSC 14 selects base station 12b. As wireless terminal 22 enters region 20, base station 12a measures the position and direction of wireless terminal 22. MSC 14 switches the call to base station 12a due to the position and trajectory of wireless terminal 22 as indicated by arrow 24. Thus, base stations 12a and 12b constructed according to the teachings of the present invention may reduce the number of service interruptions experienced by wireless terminal 22 as it travels in wireless system 10.

Figure 2:
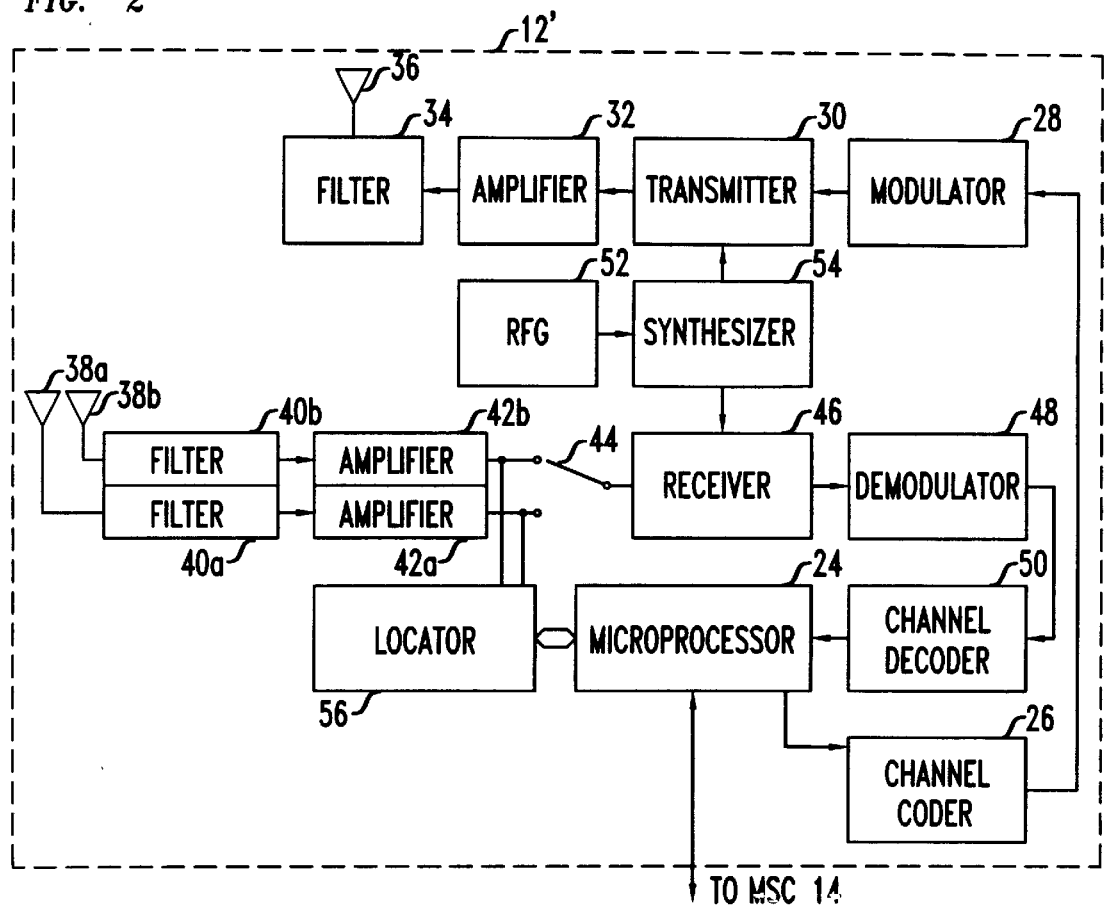
FIG. 2 is a block diagram of an embodiment of a base station for use in the wireless telephony system of FIG. 1.

FIG. 2 is a block diagram of an embodiment of a base station indicated generally at 12' for use in system 10 of FIG. 1 and constructed according to the teachings of the present invention. Base station 12' may incorporate a digital or an analog architecture. For example, base station 12' may support digital wireless technologies such as Time Division Multiple Access (TDMA), Code Division Multiple Access (CDMA) and Global Systems for Mobile Communications (GSM). Alternatively, base station 12' may be constructed for use in an analog environment such as Advanced Mobile Phone Service (AMPS).

As shown, base station 12' includes a forward channel for transmitting signals to a wireless terminal 22. Base station 12' also includes a reverse channel for receiving signals from wireless terminal 22. Base station 12' includes a microprocessor 24 that communicates with MSC 14. Microprocessor 24 also controls the operation of each of the elements of base station 12'. The forward channel of base station 12' includes the series connection of channel coder 26, modulator 28, transmitter 30, amplifier 32, filter 34, and antenna 36. In the reverse channel, base station 12' includes a pair of diversity antennas 38a and 38b that are each coupled to bandpass filters 40a and 40b, respectively, and low noise amplifiers 42a and 42b, respectively. Amplifiers 42a and 42b are coupled by a switch 44 to a receiver 46. Receiver 46 is coupled to demodulator 48. Demodulator 48 is coupled to channel coder 50. Channel coder 50 is coupled to microprocessor 24. The forward and reverse channels of base station 12' share a reference frequency generator 52 and a synthesizer 54. Synthesizer 54 is coupled to control transmitter 30 and receiver 46. Finally, base station 12' includes passive locator circuit 56 which is coupled to microprocessor 24 and the output of amplifiers 42a and 42b.

In operation, base station 12' receives a signal from a wireless terminal 22 in the reverse channel at diversity antennas 38a and 38b. Bandpass filters 40a and 40b and low noise amplifiers 42a and 42b amplify and filter the signals from antennas 38a and 38b. Microprocessor 24 selects between the outputs of amplifiers 42a and 42b based on the respective power levels of the signals output by amplifiers 42a and 42b. Switch 44 couples the appropriate amplifier 42a or 42b to receiver 46. Demodulator 48 demodulates the received signal and channel decoder 50 corrects the demodulated signal for any transmission errors. Microprocessor 24 transmits the decoded signal to MSC 14 to complete the call.

In the forward channel a signal is received by microprocessor 24 from MSC 14. The signal is encoded by channel coder 26 for error correction. The signal is modulated by modulator 28 and transmitted by the combination of transmitter 30, amplifier 32, filter 34 and antenna 36. It is noted that the reference frequency generator 52 and synthesizer 54 are used to provide appropriate frequencies for receiver 46 and transmitter 30.

Passive locator 56 determines the position and trajectory of wireless terminal 22 for use by MSC 14 in call processing. Passive locator 56 passively determines the position of wireless terminal 22 using the communication transmitted by wireless terminal 22. Passive locator 56 also converts the signal from wireless terminal 22 into data to determine the trajectory of wireless terminal 22. For example, passive locator 56 may generate data reflecting the Doppler effect on the frequency of the signal from wireless terminal 22. By way of example and not by way of limitation, passive locator 56 could thus determine if wireless terminal 22 is traveling generally perpendicular to a radius of base station 12', generally toward base station 12', or generally away from base station 12'. Passive locator 56 could alternatively use the data to determine a more exact trajectory for wireless terminal 22. Passive locator 56 provides the trajectory and position information to MSC 14. MSC 14 uses the position and trajectory to determine when base station 12' is the appropriate base station for a call from wireless terminal 22.

Figure 3:
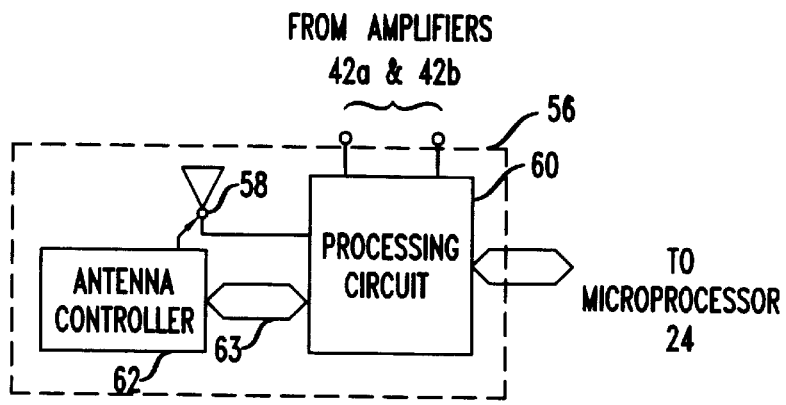
FIG. 3 is a block diagram of an embodiment of a passive locator constructed according to the teachings of the present invention for use in the base station of FIG. 2.

FIG. 3 is a block diagram of an embodiment of a locator indicated generally at 56' and constructed according to the teachings of the present invention. Locator circuit 56' includes a directional antenna 58 that is coupled to a processing circuit 60. Antenna 58 may comprise, for example, a gimbal antenna or other appropriate antenna that can be controlled, in azimuth and elevation, to detect the direction of an incoming signal. Antenna 58 is controlled by antenna controller 62. Antenna controller 62 is coupled to processing circuit 60 by a data bus 63. Processing circuit 60 is also coupled to microprocessor 24 and amplifiers 42a and 42b of FIG. 2.

In operation, processing circuit 60 controls antenna 58 via antenna controller 62 so as to determine the position of wireless terminal 22. Processing circuit 60 measures the power in the signal from wireless terminal 22. Processing circuit 60 sends control signals to antenna controller 62 to incrementally adjust, for example, the azimuthal and elevational angles of antenna 58 until antenna 58 receives a relative maximum power from wireless terminal 22. First, antenna 58 may rotate in a plane that is normal to the central axis of the base station 12'. This may be referred to as adjusting the azimuthal angle of antenna 58. Additionally, antenna 58 may rotate in a second plane perpendicular to the first plane. This may be referred to as adjusting the elevational angle of antenna 58. Processing circuit 60 also generates data reflecting the Doppler effect on the signal from wireless terminal 22. Processing circuit 60 uses this data to determine the trajectory of wireless terminal 22.

Figure 4:
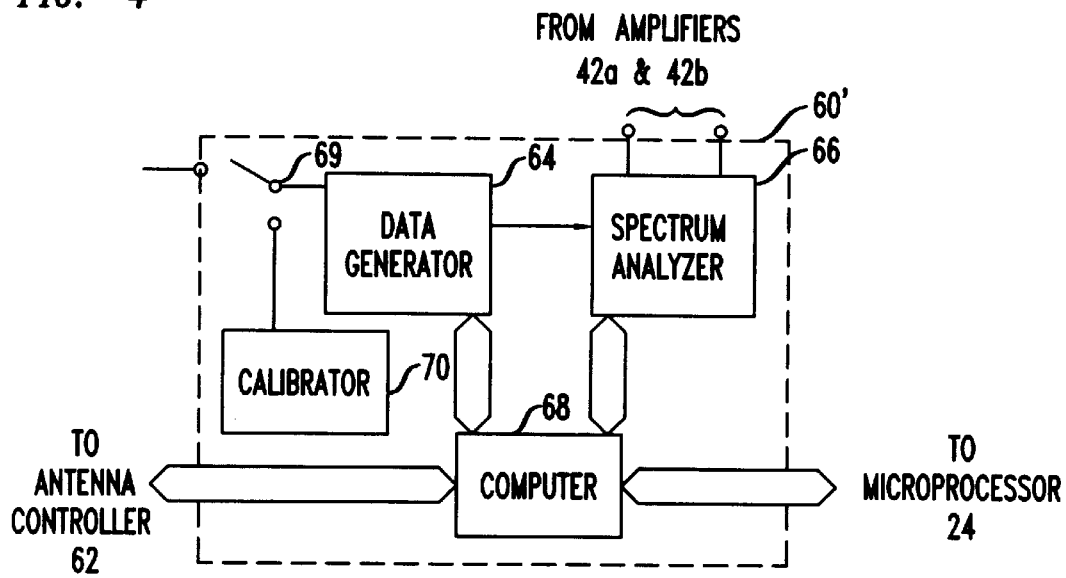
FIG. 4 is a block diagram of an embodiment of a processing circuit constructed according to the teachings of the present invention for use in the passive locator of FIG. 3.

FIG. 4 is a block diagram of a processing circuit indicated generally at 60' for use in locator 56' of FIG. 3 and constructed according to the teachings of the present invention. Processing circuit 60' includes a data generator 64, a spectrum analyzer 66 and a computer 68. A switch 69 couples either directional antenna 58 or calibrator 70 to data generator 64. Data generator 64 is coupled to spectrum analyzer 66. Computer 68 is coupled to antenna controller 62, microprocessor 24, data generator 64, and spectrum analyzer 66. Computer 68 may be an appropriate microprocessor based personal computer.

In operation, processing circuit 60' generates signals to control antenna 58 and generates data to determine the trajectory of wireless terminal 22. Spectrum analyzer 66 receives a signal from antenna 58 through data generator 64. Spectrum analyzer 66 measures the power in the signal and passes this data to computer 68. Computer 68 generates control signals for antenna controller 62 based on a comparison of the current power measurement from spectrum analyzer 66 with a previous power measurement. Thus, processing circuit 60' causes antenna 58 to rotate until it detects a relative maximum power in the signal for wireless terminal 22.

Data generator 64 generates data that represents the Doppler effect on the frequency of the signal from wireless terminal 22. Computer 68 uses the data from data generator 64 to calculate the trajectory of wireless terminal 22.

Figure 5:
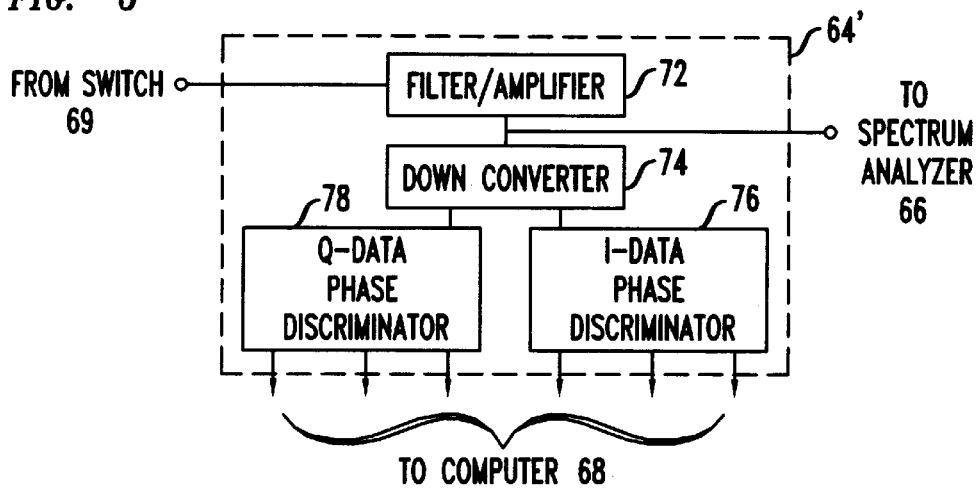
FIG. 5 is a block diagram of an embodiment of data generator constructed according to the teachings of the present invention for use in the processing circuit of FIG. 4.

FIG. 5 is a block diagram of an embodiment of a data generator indicated generally at 64' and constructed according to the teachings of the present invention. Data generator 64' performs functions to be used in determining both the position and the trajectory of a wireless terminal 22. Specifically, data generator 64' passes data to spectrum analyzer 66 for use in determining the position of wireless terminal 22. Additionally, data generator 64' generates data that reflects the Doppler effect on the frequency of wireless terminal 22 for use in determining the trajectory of wireless terminal 22.

Data generator 64' includes a filter and amplifier 72. Filter and amplifier 72 is coupled to switch 69. Thus, a signal received at directional antenna 58 is provided to data generator 64' through filter and amplifier 72. The output of filter and amplifier 72 is coupled to spectrum analyzer 66. Thus, data generator 64' passes data to spectrum analyzer 66 to determine the position of wireless terminal 22.

The output of filter and amplifier 72 is also coupled to down converter 74. Down converter 74 produces two output signals: an in-phase signal and a quadrature signal. Down converter 74 provides the IF (Intermediate Frequency) inphase signal to I-data phase discriminator 76. Additionally, down converter 78 provides the IF quadrature signal to Q-data phase discriminator 78. Phase converters 76 and 78 each provide three output signals to computer 68.

In operation, filter and amplifier 72 receives a signal from antenna 58 and wireless terminal 22. Down converter 74 converts RF to IF, splits it to in-phase and quadrature-phase, and demodulates the signals from filter and amplifier 72. I-data phase discriminator 76 processes the in-phase signal to generate three output signals each with a selected phase with respect to the input in-phase signal. Quadrature phase discriminator 78 processes the quadrature signal to generate three corresponding output signals each with a selected phase with respect to the input quadrature-phase signal. Computer 68 uses the corresponding outputs of phase discriminator 76 and 78 to calculate the most likely trajectory of wireless terminal 22.

Figure 6:
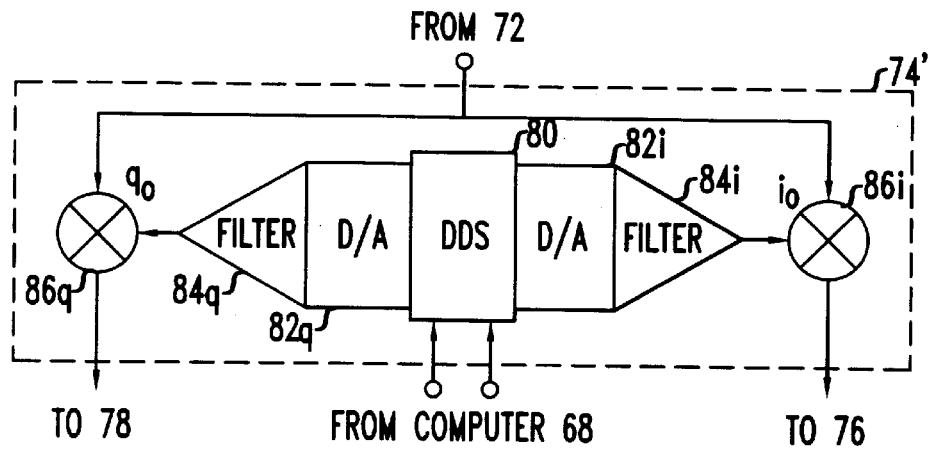
FIG. 6 is a block diagram of an embodiment of a down conversion circuit constructed according to the teachings of the present invention for use in the data generator of FIG. 5.

FIG. 6 is an embodiment of a down converter indicated generally at 74' and constructed according to the teachings of the present invention. As described above, data generator circuit 64' processes a signal received at directional antenna 58 in two paths. One path processes the in-phase signal and the other path processes the quadrature signal. For convenience in explanation, the corresponding components in each path are identified with the same reference numeral along with either the identifier i or the identifier q. The identifier i is used for the components that process the in-phase signal and the identifier q is used for the components that process the quadrature-phase signal. Down converter 74' generates in-phase and quadrature-phase local oscillators, $i_0$ and $q_0$, respectively. Down converter 74' includes a direct digital synthesizer (DDS) 80 coupled to computer 68 to receive data representing the frequency for wireless terminal 22. DDS 80 is coupled to first and second digital to analog (D/A) converters 82i and 82q. D/A converters 82i and 82q are coupled to filters 84i and 84q, respectively. Filters 84q and 84i are coupled to mixers 86q and 86i, respectively. Finally, mixers 86q and 86i are also coupled to filter and amplifier 72.

In operation, down converter 74' demodulates the signal from filter and amplifier 72. DDS 80 receives digital data from computer 68 corresponding to the desired local oscillator frequencies. D/A converters 82q and 82i convert the digital data to analog signals. Filters 84q and 84i filter and apply the signals to mixers 86q and 86i, respectively. Mixers 86q and 86i demodulate the signal from filter and amplifier 72.

Figure 7:
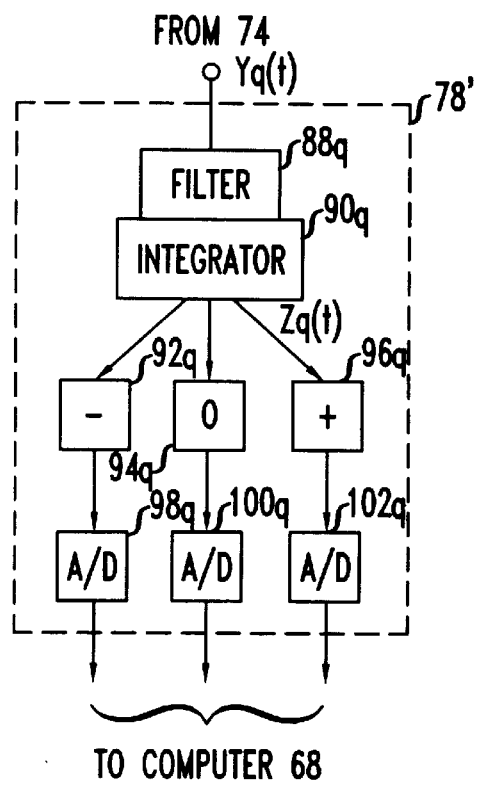
FIG. 7 is a block diagram of an embodiment of an in-phase data circuit constructed according to the teachings of the present invention for use in the data generator of FIG. 5.
Figure 8:
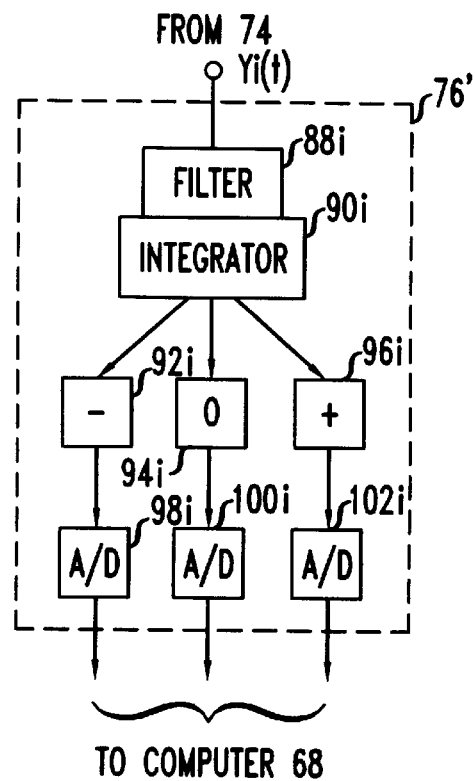
FIG. 8 is a block diagram of a quadrature-phase data circuit constructed according to the teachings of the present invention for use in the data generator of FIG. 5.

FIGS. 7 and 8 are block diagrams of embodiments of i-data and qdata phase discriminators indicated generally at 76' and 78', respectively, and constructed according to the teachings of the present invention. For clarity, only the structure of i-data phase discriminator 78' is described. Q-data phase discriminator 76' comprises the same components, but processes the quadrature signal.

I-data phase discriminator 78' comprises a filter 88i coupled between down converter 74 and integrator 90i. The output of integrator 90i is tapped by three phase taps 92i, 94i, and 96i. Each phase tap introduces a different phase into the signal output by integrator 90i. Phase taps 92i, 94i and 96i are coupled to analog to digital (A/D) converters 98i, 100i, and 102i, respectively. Computer 68 compares corresponding output of A/D converters 98q and 98i with A/D converters 100q and 100i and with A/D converters 102q and 102i to determine the trajectory of wireless terminal 102.

In operation, i-data phase discriminator 76' and q-data phase discriminator 78' generate data from which the trajectory of wireless terminal 22 can be determined. This data reflects the Doppler effect on the signal received from wireless terminal 22. The Doppler effect, as defined in physics, is a frequency shift phenomenon caused by a moving source of frequency relative to the medium. The Doppler effect may be measured by looking at the magnitude and phase of a signal having a known frequency. Phase discriminators 76' and 78' generate magnitude and phase information for three cases. The first case is labeled "+" and corresponds to a wireless terminal 22 moving toward a base station. The + data is generated by phase taps 96i and 96q and A/D converters 102i and 102q. The second case is labeled "0" and corresponds to a wireless terminal traveling on a trajectory that maintains a substantially constant distance from a base station. The 0 data is generated by phase taps 94$i$ and 94$q$ and A/D converters 100$i$ and 100$q$. The final case is labeled "−" and corresponds to a wireless terminal 22 traveling away from a base station 12. The data is generated by phase taps 92$i$ and 92$q$ and A/D converters 98$i$ and 98$q$.

Phase discriminators 76' and 78' process a signal, R(t), from antenna 58 and wireless terminal 22 to produce the data that represents the Doppler effect on the signal R(t). The signal R(t) can be represented as:

$$R(t)=\cos[\omega_0 t+\phi(t)] \qquad (1)$$

In equation 1, $\omega_0$ is the carrier frequency of the signal, and $\phi(t)$ is a time varying phase angle. For purposes of clarity, the amplitude of the signal R(t) is assumed to be constant and equal to 1.

The Doppler effect on R(t) can be assessed by isolating and analyzing the time varying angle $\phi(t)$. Using the angle-sum relation, R(t) may be expanded as follows:

$$R(t)=[\cos \omega_0 t \cos\phi(t)-\sin\omega_0 t \sin\phi(t)]. \qquad (2)$$

Down converter 74 generates local oscillators $i_0$ and $q_0$ to demodulate R(t) according to the following relations:

$$i_0=\cos\omega_0 t \qquad (3)$$

$$q_0=\sin \omega_0 t \qquad (4)$$

Thus, the inputs to phase discriminators 76' and 78' may be represented as:

$$Y_i(t)=R(t)\cdot i_0 \qquad (5)$$

$$Y_q(t)=R(t)\cdot q_0 \qquad (6)$$

Substituting equations 2, 3 and 4 into equations 5 and 6 yields:

$$Y_i(t)=\cos^2\omega_0 t \cos\phi(t)-\sin \omega_0 t \cos\omega_0 t \sin\phi(t); \text{ and} \qquad (7)$$

$$Y_q(t)=\cos\omega_0 t \sin\omega_0 t \cos\phi(t)-\sin^2\omega_0 t \sin\phi(t) \qquad (8)$$

Using trigonometric identities, equations 7 and 8 may be represented as follows:

$$Y_i(t) = \frac{I(t)}{2} + \frac{I(t)}{2}\cos 2\omega_0 t - \frac{Q(t)}{2}\sin 2\omega_0 t; \text{ and} \qquad (9)$$

$$Y_q(t) = \frac{Q(t)}{2} - \frac{Q(t)}{2}\cos 2\omega_0 t - \frac{I(t)}{2}\sin 2\omega_0 t \qquad (10)$$

In equations 9 and 10, I(t) was substituted for $\cos\phi(t)$ and Q(t) was substituted for $\sin\phi(t)$.

Filters 88$q$ and 88$i$ can eliminate the effect of the second and third terms of equations 9 and 10 thus isolating the terms that depend only on the time varying phase angle $\phi(t)$. Integrators 90$q$ and 90$i$ integrate the output of filters 88$q$ and 88$i$ over a symbol period of the signal R(t) to produce the output:

$$Z_i(T) = \int_0^T I(\tau)H(\tau)d\tau \qquad (11)$$

$$Z_q(T) = \int_0^T Q(\tau)H(\tau)d\tau \qquad (12)$$

In equations 11 and 12 the signal H($\tau$) is the impulse response of the integrators 90$q$ and 90$i$. Phase taps 92, 94, and 96 tap the output of integrator 90 to introduce selected phases into the signals $Z_i(t)$ and $Z_q(t)$. The output of phase taps 92, 94, and 96 are converted to digital data by A/D converters 98, 100 and 102. Computer 68 collects and stores samples of data from phase discriminator 78' and 76'. Computer 68 calculates the magnitude and phase for the three cases (+, 0, and −) according to equations 11 through 16 below using m samples.

Magnitude $$|Z_+| = \frac{1}{m} \sum_{n=1}^{m} \sqrt{Z_{i+}^2(n) + Z_{q+}^2(n)} \qquad (13)$$

$$|Z_0| = \frac{1}{m} \sum_{n=1}^{m} \sqrt{Z_{i0}^2(n) + Z_{q0}^2(n)} \qquad (14)$$

$$|Z_-| = \frac{1}{m} \sum_{n=1}^{m} \sqrt{Z_{i-}^2(n) + Z_{q-}^2(n)} \qquad (15)$$

Phase $$\sphericalangle Z_+ = \frac{1}{m} \sum_{n=1}^{m} \tan^{-1}\left[\frac{Z_{q+}(n)}{Z_{i+}(n)}\right] \qquad (16)$$

$$\sphericalangle Z_0 = \frac{1}{m} \sum_{n=1}^{m} \tan^{-1}\left[\frac{Z_{q0}(n)}{Z_{i0}(n)}\right] \qquad (17)$$

$$\sphericalangle Z_- = \frac{1}{m} \sum_{n=1}^{m} \tan^{-1}\left[\frac{Z_{q-}(n)}{Z_{i-}(n)}\right] \qquad (18)$$

Computer 68 compares the calculated magnitude and phase angles from the three cases to determine which of these values is greatest. If the magnitude and phase of $Z_+$ according to equations 13 and 16 are greatest, computer 68 indicates that wireless terminal 22 is traveling away from base station 12. If the magnitude and phase of $Z_0$ according to equations 14 and 17 are greatest, computer 68 indicates that wireless terminal 22 is traveling at a substantially constant distance from base station 12. If the magnitude and phase of $Z_-$ according to equations 15 and 18 are greatest, computer 68 indicates that wireless terminal 22 is traveling toward base station 12.

FIG. 9 is a flow chart of one embodiment of a method for determining the position and trajectory of a wireless terminal 22 according to the teachings of the present invention. FIGS. 10 through 16 are flow charts of embodiments of various steps in the method of FIG. 9. For pedagogical purposes, the embodiments of the method of FIGS. 9 through 16 are described with respect to FIGS. 2 through 8. However, the teachings of the present invention are not so limited. It will be understood by those of ordinary skill in the art that other systems may be used to implement the steps described with respect to FIGS. 9 through 16.

The method of FIG. 9 begins at block 200. At block 202, locator 56 ositions antenna 58 in a first selected orientation. At block 204, locator 56 easures the power detected in the signal from wireless terminal 22. Locator 56 adjusts the orientation of directional antenna 58 until directional antenna 58 receives a relative maximum power at block 206. At block 208, locator 56 converts the signal from wireless terminal 22 into data that reflects the Doppler effect on the frequency of the signal from wireless terminal 22. At block 210 locator 56 determines the trajectory from the data. The method ends at block 212.

FIG. 10 is a flow chart illustrating embodiments of blocks 202 and 204 of FIG. 4. The method of FIG. 10 begins by setting the azimuthal angle of directional antenna 58 to an initial orientation at block 214. At block 216, antenna controller 62 sets the elevational angle of directional antenna 58 to an initial orientation. At block 218, locator circuit 56 receives a frequency assigned to a wireless terminal 22 from microprocessor 24. At block 220, locator circuit 56 sets spectrum analyzer 66 to the selected frequency. Locator circuit 56 connects spectrum analyzer 66 to data generator 64 at block 222. At block 224, spectrum analyzer 66 measures the power in a signal received at antenna 58 from wireless terminal 22 through data generator 64. Spectrum analyzer 66 stores the measured power at block 226 in computer 68 in a memory location identified as TEMP. Thus, blocks 202' and 204' of FIG. 10 illustrate one embodiment of a method for initializing locator circuit 56 with a first reading of the power of a signal transmitted by wireless terminal 22 on a selected frequency.

Figure 11:
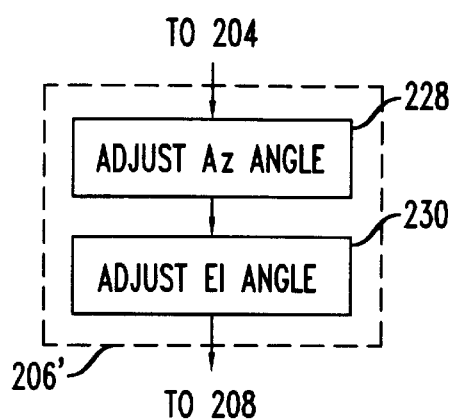

FIG. 11 is a flow chart of an embodiment of block 206 of FIG. 9 according to the teachings of the present invention. The method of FIG. 11 adjusts the orientation of antenna 58 by sequentially adjusting the azimuthal and elevational angles of antenna 58. It will be understood by those of ordinary skill in the art that there are other techniques for adjusting the orientation of antenna 58.

At block 228, locator 56 adjusts the azimuthal angle of antenna 58 until antenna 58 measures a relative maximum power. At block 230, locator 56 adjusts the elevational angle of antenna 58 until antenna 58 measures a relative maximum power. Thus, locator 56 determines the position of wireless terminal 22.

Figure 12:
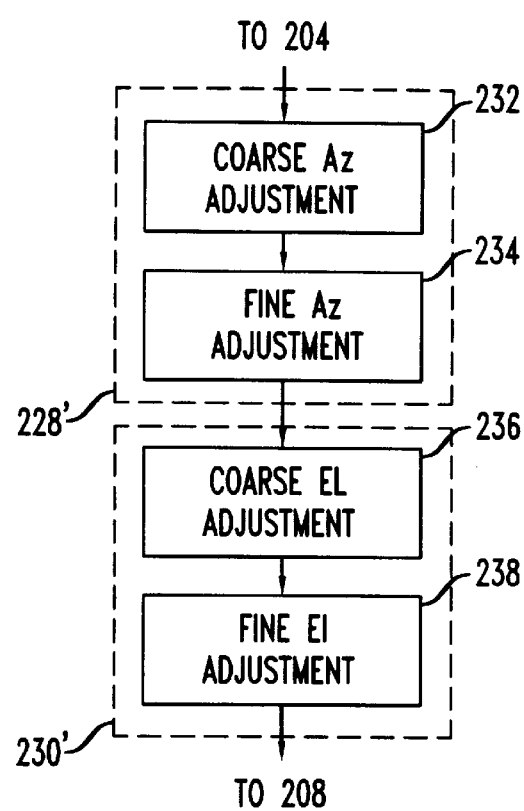

FIG. 12 is a flow chart of embodiments of blocks 228 and 230 of FIG. 11 according to the teachings of the present invention. The method of FIG. 12 adjusts each of the azimuthal and elevational angles of antenna 58 in two steps. At block 232, locator 56 adjusts the azimuthal angle of antenna 58 by increments of K° so as to perform a coarse adjustment. At block 234, locator 56 adjusts the azimuthal angle by an angular increment less than K° so as to perform a fine adjustment. At block 236, locator 56 adjusts the elevational angle of antenna 58 by increments of K° so as to perform a coarse adjustment. At block 238, locator 56 finally adjusts the elevational angle by an angular increment less than K° so as to perform a fine adjustment.

Figure 13:
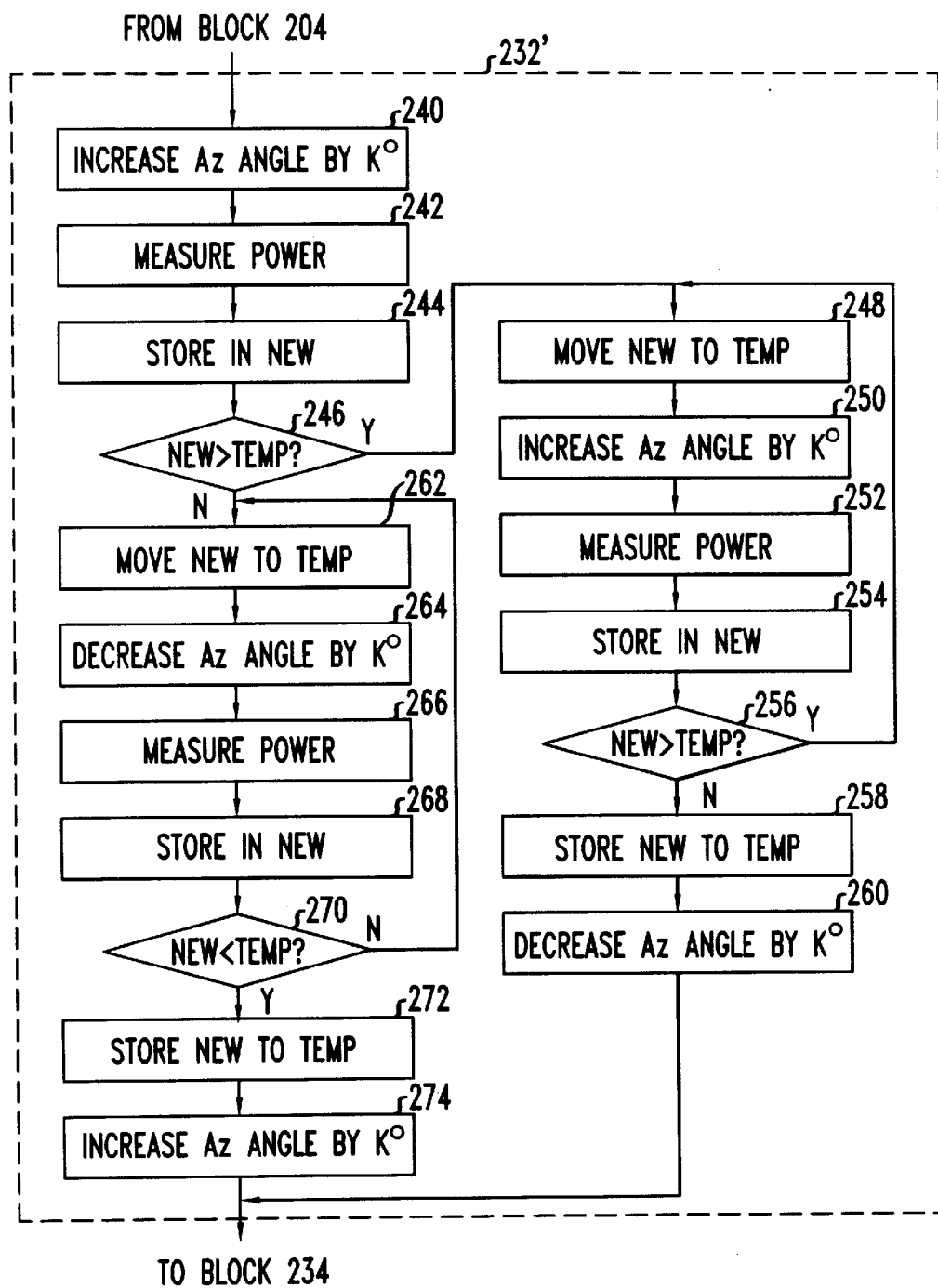

The method of FIG. 13 begins at block 240 wherein antenna controller 62 increases the azimuthal angle of antenna 58 by K°. For example, antenna controller 62 may increase the azimuthal angle in increments of 10° or any other appropriate angle. Locator circuit 56 measures the power of the signal transmitted by wireless terminal 22 with spectrum analyzer 66 at block 242. Spectrum analyzer 66 stores this measured power in a memory location identified as NEW in computer 68 at block 244. Computer 68 determines whether the value in NEW is greater than the value in TEMP at decisional block 246.

If the answer is yes, the method proceeds to block 248 wherein the value stored in NEW is moved to TEMP. At block 250, computer 68 and antenna controller 62 adjusts the azimuthal angle of directional antenna 58 by an additional K°. Spectrum analyzer 66 again measures the power in the signal received from wireless terminal 22 at block 252. At block 254, spectrum analyzer 66 stores the measured value in NEW in computer 68. At block 256, computer 68 determines whether the value in NEW is greater than the value in TEMP. If the answer is yes, the method returns to block 248. If the answer is no, the method continues to block 258. At block 258, the value stored in NEW is transferred to TEMP. At block 260, the azimuthal angle is decreased by K° because directional antenna 58 overshot wireless terminal 22 by one angular increment.

If the answer at block 246 is no, the method proceeds to block 262. At block 262, computer 68 moves the value in NEW to TEMP. Computer 68 and antenna controller 62 decrease the azimuthal angle of directional antenna 58 by K° at block 264. At block 266, spectrum analyzer 66 measures the power in the signal received from wireless terminal 22 and stores this value in NEW at block 268. At 30 decisional block 270, computer 68 determines whether the value in NEW is less than the value in TEMP. If the answer is no, the method returns to step 262. If, however, the answer is yes, the method proceeds to block 272 and stores the value in NEW to TEMP. The method also increases the azimuthal angle by K° at block 274 because directional antenna 58 overshot wireless terminal 22 angle by one angular increment.

Figure 14:
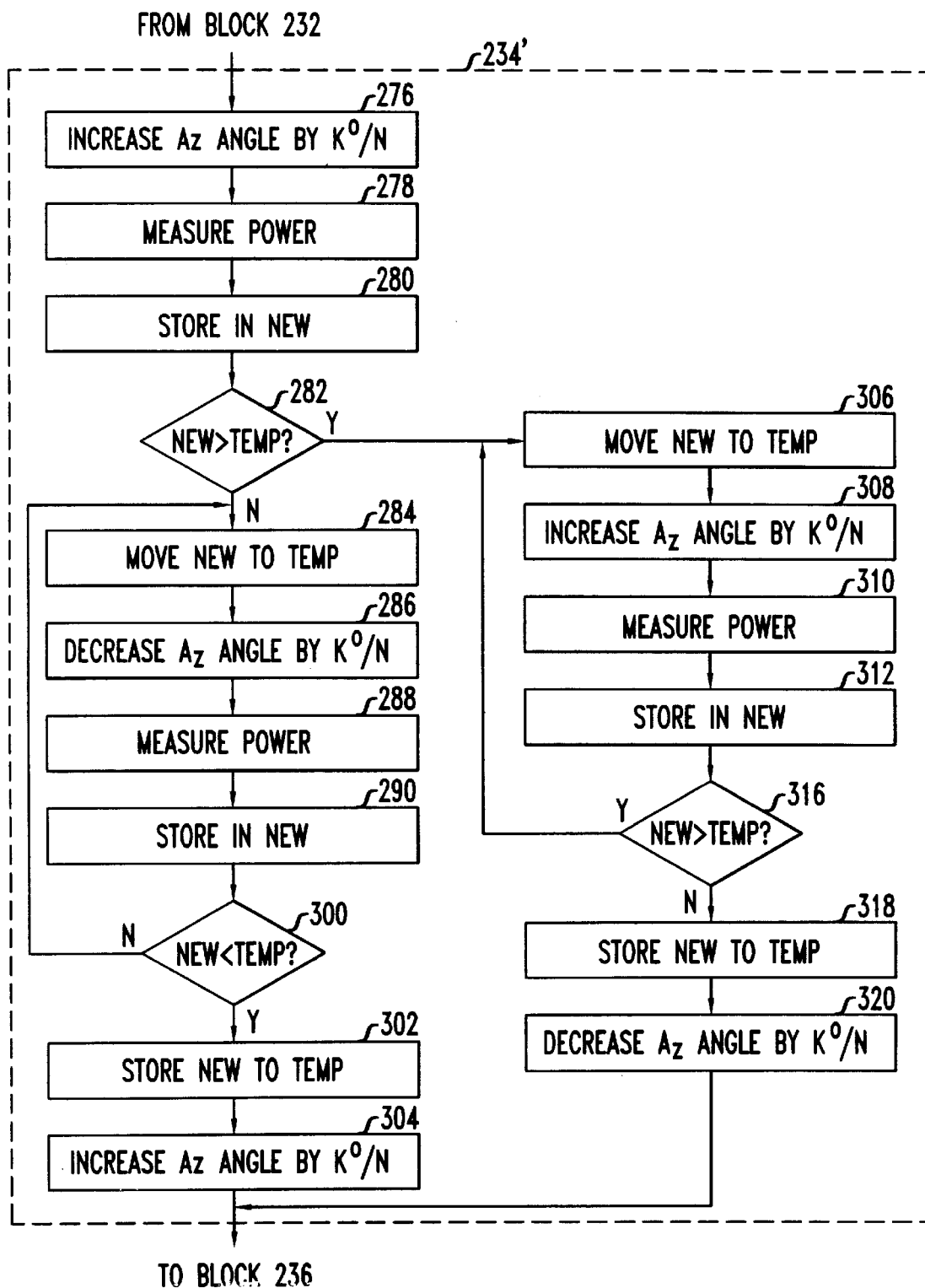

The method of FIG. 14 performs a fine azimuth adjustment. The method begins at block 276 by increasing the azimuthal angle by K°/N. For the fine adjustment, the value of N may be 10, 20 or any other appropriate number for controlling the size of the angular increments. At block 278, spectrum analyzer 66 measures the power of the signal received from wireless terminal 22 and stores this value in NEW at block 280. At decisional block 282, locator circuit 56 determines whether the value stored in NEW is greater than the value stored in TEMP. If the answer is no, the method proceeds to block 284 and moves the value in NEW to a memory location labeled TEMP. At block 286, computer 68 and antenna controller 62 decrease the azimuthal angle of directional antenna 58 by K°/N. At block 288, spectrum analyzer 66 measures the power in the signal received from wireless terminal 22 and stores the value in NEW in computer 68 at block 290. At block 300, computer 68 determines whether the value in NEW is less than the value in TEMP. If the answer is no, the method returns to block 284. If, however, the answer is yes, the method proceeds to block 302 and stores the value in NEW to TEMP. At block 304, computer 68 and antenna controller 62 increase the azimuthal angle of directional antenna 58 by K°/N because directional antenna 58 rotated past wireless terminal 22 by one angular increment.

At block 282, if the answer is yes, the method proceeds to block 306 and moves the value in NEW to TEMP. At block 308, computer 68 and antenna controller 62 increase the azimuthal angle of directional antenna 58 by K°/N. Spectrum analyzer 66 measures the power in the signal received from wireless terminal 22 at block 310 and stores the power in NEW in computer 68 at block 312. At block 316, computer 68 determines whether the value in NEW is greater than the value in TEMP. If the answer is yes, the method returns to block 306. If, however, the answer is no, the method continues to block 318 and stores the value in NEW to the memory location labeled TEMP. At block 320, computer 68 and antenna controller 62 decrease the azimuthal angle of directional antenna 58 by K°/N because directional antenna 58 rotated past wireless terminal 22 by one increment. Thus, the method of FIG. 8 fine tunes the azimuthal angle of directional antenna 58 to be directed toward wireless terminal 22.

Figure 15:
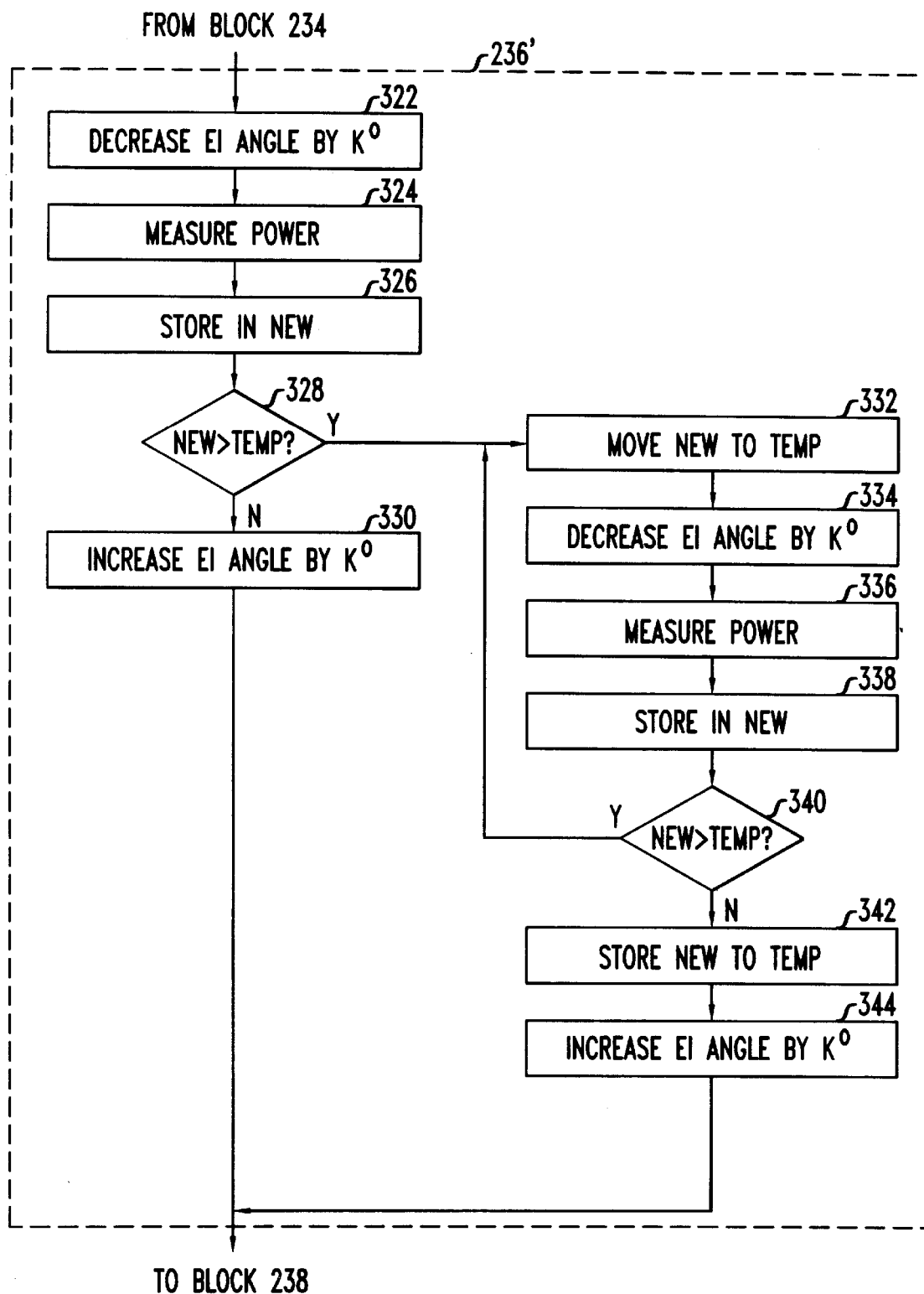

The method of FIG. 15 begins at block 322 wherein antenna control 64 decreases the elevational angle of directional antenna 58 by K°. At block 324 spectrum analyzer 66 measures the power in the signal from wireless terminal 22 and stores that measured value in NEW in computer 68 at block 326. At decisional block 328, computer 68 determines whether the value stored in NEW is greater than the value stored in TEMP. If the answer is no, the method proceeds to block 330 wherein antenna controller 62 increases the elevational angle of directional antenna 58 by K° because the original position of directional antenna 58 measured a peak power level from wireless terminal 22.

If the answer at decisional block 328 is yes, the method proceeds to lock 332 and stores the value in NEW to TEMP. At block 334, computer 68 and antenna controller 62 decrease the elevational angle of directional antenna 58 by K°. Spectrum analyzer 66 measures the power in the signal received from wireless terminal 22 at block 336 and stores the measured power in NEW in computer 68 at block 338. At block 340, computer 68 determines whether the value stored in NEW is greater than the value stored in TEMP. If the answer is yes, the method returns to block 332. If the answer is no, the method proceeds to block 342 and stores the value in NEW to TEMP. Finally, the method proceeds to block 344 and increases the elevational angle of directional antenna 58 by K°. Thus, the method of FIG. 8 performs a coarse adjustment to locate the general direction of wireless terminal 22 based on the peak power received from wireless terminal 22.

Figure 16:
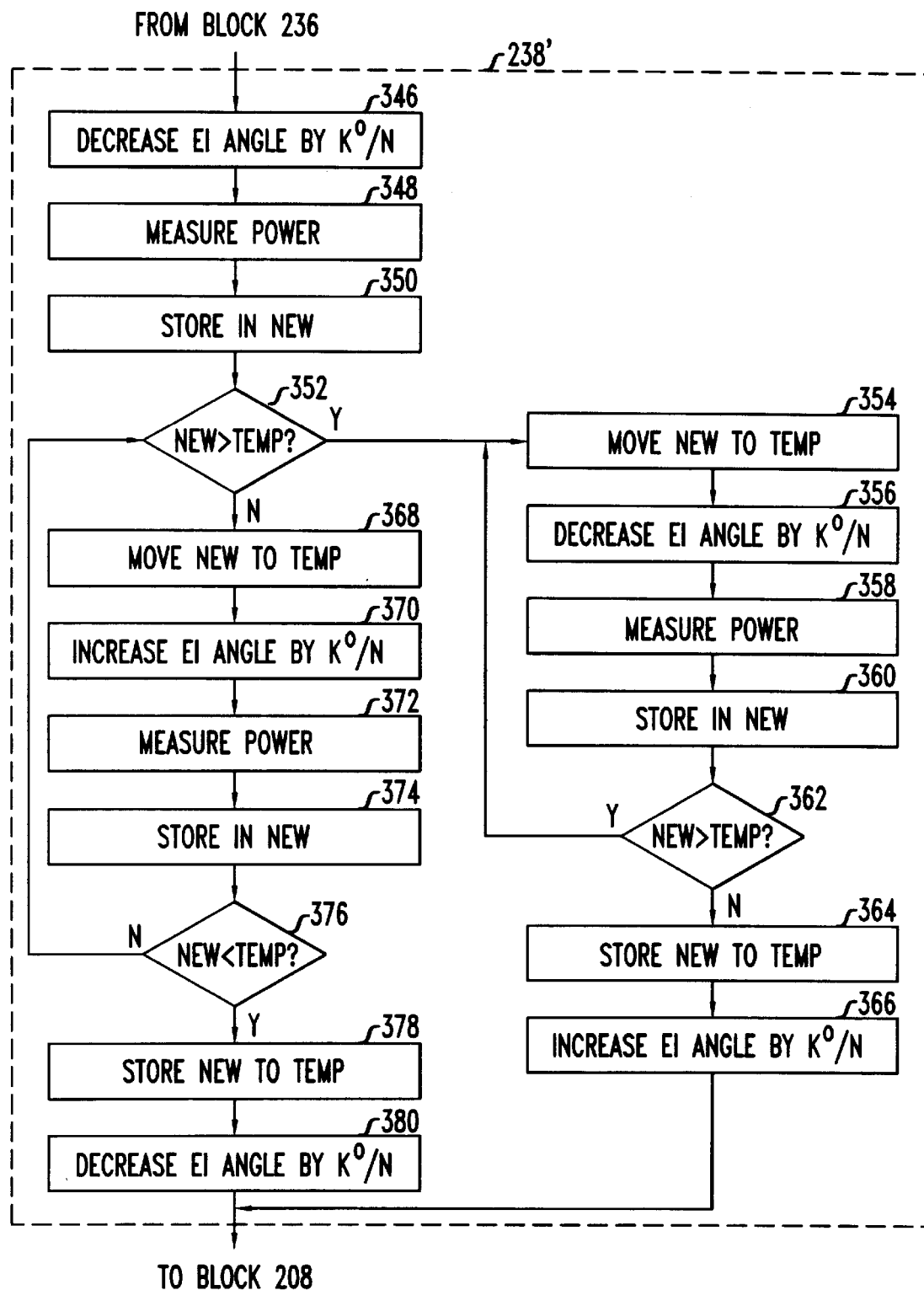

The method of FIG. 16 begins at block 346. Computer 68 and antenna controller 62 decrease the elevational angle of directional antenna 58 by K°/N. At block 348, spectrum analyzer 66 measures the power of the signal received from wireless terminal 22 and stores this value in NEW at block 350. At block 352, computer 68 determines whether the value stored in NEW is greater than the value stored in TEMP. If the answer is yes, the method proceeds to block 354 and moves the value stored in NEW to TEMP. At block 356, antenna controller 62 decreases the elevational angle of directional antenna 58 by K°/N. Spectrum analyzer 66 measures the power in the signal from wireless terminal 22 at block 358 and stores the measured power in NEW in computer 68 at block 360. At block 362, computer 68 determines whether the value stored in NEW is greater than the value stored in TEMP. If the answer is yes, the method returns to block 354. If, however, the answer is no, the method proceeds to block 364 and stores the value in NEW to TEMP. At block 366, antenna controller 62 increases the elevational angle of directional antenna 58 by K°/N to return directional antenna 58 to the position in which the peak power was measured.

At block 352 if the answer is no, the method proceeds to block 368 and stores the value in NEW to TEMP. At block 370, antenna controller 62 increases the elevational angle of directional antenna 58 by K°/N. At block 372, spectrum analyzer 66 measures the power in the signal received from wireless terminal 22 and stores this value in a memory location labeled new in computer 68 at block 374. At block 376, computer 68 determines whether the value in NEW is less than the value in TEMP. If the answer is no, the method returns to block 368. If the answer is yes, the method proceeds to block 378 and stores the value in NEW to TEMP. Finally, the method proceeds to block 380 wherein antenna control 64 decreases the elevational angle of directional antenna 58 by K°/10 to return directional antenna 58 to the direction of the maximum power from wireless terminal 22. Thus, locator circuit 56 performs a fine adjustment to the elevational angle of antenna 58 such that antenna 58 is directed toward wireless terminal 22.

Although the present invention has been described in detail, various changes, alterations and substitutions can be made thereto without departing from the spirit and scope of the invention as defined by the appended claims. For example, locator 56 may be modified to detect more than the three trajectories described above.

I claim:

1. A passive locator for a base station in a wireless communication system, said locator comprising:

a directional antenna that receives a signal from a wireless terminal;

a processing circuit responsive to said directional antenna that measures the power of a signal received from the wireless terminal so as to adjust the orientation of said directional antenna by detecting a relative maximum power in the signal from the wireless terminal so as to determine the location of said wireless terminal; and said processing circuit further operable to convert the signal from the wireless terminal into data so as to determine a trajectory of the wireless terminal, said processing circuitry includes a down conversion circuit responsive to said directional antenna that demodulates the signal received from the wireless terminal into in-phase and quadrature signals and further includes first and second phase discriminator circuits responsive to said in-phase and quadrature signals, respectively, that each generate two or more sets of corresponding phase tapped outputs of the signals from said down conversion circuit integrated over a symbol period such that each set corresponds to a selected trajectory with respect to said base station.

2. The passive locator of claim 1, wherein said computer determines the trajectory of the wireless terminal by calculating the phase and magnitude of the corresponding phase tapped outputs of the first and second phase discriminators and comparing the phase and magnitudes to select the phase tapped output with the largest phase and magnitude.

3. The locator of claim 1, wherein said directional antenna being directed to the direction of an incoming signal by adjusting azimuthal and elevational angles of said directional antenna.

4. The locator of claim 1, and further comprising an antenna controller responsive to said processing circuit to adjust said directional antenna.

5. The locator of claim 1, wherein said directional antenna comprises a gimbal antenna.

6. The locator of claim 1, wherein said processing circuit comprises:

a spectrum analyzer responsive to said directional antenna that measures the power in a signal received from the wireless terminal; and a computer responsive to said spectrum analyzer that compares successive power measurements from said spectrum analyzer so as to generate control signals for said antenna controller.

7. The locator of claim 1, wherein said processing circuit comprises a circuit that determines the trajectory of the wireless terminal from the Doppler effect on the frequency of the signal of the wireless terminal.

8. The locator of claim 1, wherein said directional antenna being in addition to at least one antenna which receives signals from said wireless terminal.

9. The locator of claim 1, wherein said orientation of said directional antenna is mechanically adjusted toward the wireless terminal.

10. The locator of claim 1, wherein said computer determines the trajectory of the wireless terminal by calculating the phase and magnitude of the corresponding phase tapped outputs of the first and second phase discriminators and comparing the phase and magnitudes to select the phase tapped output with the largest phase and magnitude.

11. A method for determining the position and trajectory of a wireless terminal in a wireless communication system, said method comprising the steps of:

measuring the power of a signal transmitted from the wireless terminal to a directional antenna;

adjusting the orientation of the directional antenna until the directional antenna is oriented so as to receive a relative maximum power of the signal from the wireless terminal;

demodulating the signal received from the wireless terminal into in-phase and quadrature signals with a down conversion circuit; and generating two or more sets of corresponding phase tapped outputs of the signals from the down conversion circuit integrated over a symbol period such that each set corresponds to a selected trajectory with respect to said base station using first and second phase discriminator circuits responsive to said in-phase and quadrature signals, respectively.

12. The method of claim 11 further comprises the steps of;

calculating the phase and magnitude of the corresponding phase tapped outputs of the first and second phase discriminators; and comparing the phase and magnitudes to select a phase tapped output corresponding to the trajectory of the wireless terminal.

13. A wireless infrastructure comprising:

at least one mobile switching center coupled to a public switched telephone network; and at least one base station responsive to said mobile switching center, said base station including a passive locator circuit, said passive locator circuit comprising:

a directional antenna that receives a signal from a wireless terminal;

a processing circuit responsive to said directional antenna that measures the power of a signal received from the wireless terminal so as to adjust the orientation of said directional antenna by detecting a relative maximum power in the signal from the wireless terminal so as to determine the location of said wireless terminal; and said processing circuit further operable to convert the signal from the wireless terminal into data so as to determine a trajectory of the wireless terminal, said processing circuitry including a down conversion circuit responsive to said directional antenna that demodulates the signal received from the wireless terminal into in-phase and quadrature signals and first and second phase discriminator circuits responsive to said in-phase and quadrature signals, respectively, that each generate two or more sets of corresponding phase tapped outputs of the signals from said down conversion circuit integrated over a symbol period such that each set corresponds to a selected trajectory with respect to said base station.

14. The wireless infrastructure of claim 13, wherein said computer determines the trajectory of the wireless terminal by calculating the phase and magnitude of the corresponding phase tapped outputs of the first and second phase discriminators and comparing the phase and magnitudes to select the phase tapped output with the largest phase and magnitude.

15. A method for determining the position and trajectory of a wireless terminal in a wireless communication system, said method comprising the steps of:

measuring the power of a signal transmitted from the wireless terminal to a directional antenna;

adjusting the orientation of the directional antenna until the directional antenna is oriented so as to receive a relative maximum power of the signal from the wireless terminal;

converting the signal from the wireless terminal into in-phase and quadrature signals;

generating two or more sets of corresponding phase tapped outputs from said in-phase and quadrature signals integrated over a symbol period such that each set corresponds to a selected trajectory with respect to said base station using first and second phase discriminator circuits responsive to said in-phase and quadrature signals, respectively;

calculating the phase and magnitude of the corresponding phase tapped outputs of the first and second phase discriminators; and comparing the phase and magnitudes to select a phase tapped output corresponding to the trajectory of the wireless terminal.

16. A base station comprising:

a passive locator, comprising:

a directional antenna that receives a signal from the wireless terminal;

a processing circuit responsive to said directional antenna that measures the power of the signal received from the wireless terminal so as to adjust the orientation of said directional antenna by detecting a relative maximum power in the signal from the wireless terminal so as to determine the position of said wireless terminal; and said processing circuit further including a data generator that converts the signal from the wireless terminal into two or more sets of data for a component signal of the signal from the wireless terminal such that each set corresponds to a trajectory for the wireless terminal, and a computer responsive to the data generator that manipulates the sets of data to determine the trajectory of the wireless terminal from the Doppler effect.

17. The base station of claim 16, wherein said directional antenna being directed to the direction of an incoming signal by adjusting azimuthal and elevational angles of said directional antenna.

18. The base station of claim 16, and further comprising an antenna controller responsive to said processing circuit to adjust said directional antenna.

19. The base station of claim 16, wherein said directional antenna comprises a gimbal antenna.

20. The base station of claim 16, wherein said processing circuit comprises:

a spectrum analyzer that measures the power in a signal received from the wireless terminal; and a computer responsive to said spectrum analyzer that compares successive power measurements from said spectrum analyzer so as to generate control signals for said antenna controller.

21. The base station of claim 16, wherein said processing circuit comprises a circuit that determines the trajectory of the wireless terminal from the Doppler effect on the frequency of the signal of the wireless terminal.

22. The base station of claim 16, wherein said data generator comprises:

a down conversion circuit responsive to said directional antenna that demodulates the signal received from the wireless terminal into in-phase and quadrature signals; and first and second phase discriminator circuits responsive to said in-phase and quadrature signals, respectively, that each generate two or more sets of corresponding phase tapped outputs of the signals from said down conversion circuit integrated over a symbol period such that each set corresponds to a selected trajectory with respect to said base station.

23. The base station of claim 22, wherein said computer determines the trajectory of the wireless terminal by calculating the phase and magnitude of the corresponding phase tapped outputs of the first and second phase discriminators and comparing the phase and magnitudes to select the phase tapped output with the largest phase and magnitude.

24. The base station of claim 16, wherein said orientation of said directional antenna is mechanically adjusted toward the wireless terminal.

25. The base station of claim 16, wherein said directional antenna being in addition to at least one antenna which receives signals from said wireless terminal.

26. A method for determining the trajectory of a wireless terminal in a wireless communication system, said method comprising the steps of:

converting the signal received from the wireless terminal into in-phase and quadrature signals; and generating two or more sets of corresponding phase tapped outputs of the in-phase and quadrature signals integrated over a period such that each set corresponds to a trajectory using first and second phase discriminator circuits responsive to said in-phase and quadrature signals, respectively.

27. The method of claim 26 further comprising the steps of:

calculating the phase and magnitude of the corresponding phase tapped outputs of the first and second phase discriminator circuits; and comparing the phase and magnitudes to select a phase tapped output corresponding to the trajectory of the wireless terminal.

28. The method of claim 26 further comprising the steps of:

measuring the power of the signal transmitted from the wireless terminal to a directional antenna; and adjusting the orientation of the directional antenna until the directional antenna is oriented so as to receive a relative maximum power of the signal from the wireless terminal.

* * * * *